United States Patent
Sibbach

(10) Patent No.: US 12,371,182 B1
(45) Date of Patent: Jul. 29, 2025

(54) COMPONENT HEATING IN HYBRID ELECTRIC PROPULSION SYSTEMS

(71) Applicant: General Electric Company, Evendale, OH (US)

(72) Inventor: Arthur W. Sibbach, Boxford, MA (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 18/934,560

(22) Filed: Nov. 1, 2024

(51) Int. Cl.
   *B64D 35/025* (2025.01)
   *F02C 7/32* (2006.01)
   *B60K 1/00* (2006.01)

(52) U.S. Cl.
   CPC ............. *B64D 35/025* (2024.01); *F02C 7/32* (2013.01); *B60K 2001/008* (2013.01); *F05D 2220/323* (2013.01); *F05D 2220/76* (2013.01); *F05D 2260/4031* (2013.01)

(58) Field of Classification Search
   CPC ... B64D 35/025; F02C 7/32; B60K 2001/008; F05D 2220/323; F05D 2220/76; F05D 2260/4031
   See application file for complete search history.

(56) References Cited

U.S. PATENT DOCUMENTS

| | | | |
|---|---|---|---|
| 6,394,210 B2 | 5/2002 | Matsuda et al. | |
| 10,151,299 B2 | 12/2018 | Petersen et al. | |
| 10,344,877 B2 | 7/2019 | Roche et al. | |
| 10,396,417 B2 | 8/2019 | Bollman | |
| 10,752,129 B2 | 8/2020 | Julien et al. | |
| 11,691,743 B2 | 7/2023 | Karikomi et al. | |
| 11,990,597 B2 | 5/2024 | Rheaume | |
| 2017/0217328 A1* | 8/2017 | Patel | B60K 1/04 |
| 2017/0284062 A1 | 10/2017 | Osaka et al. | |
| 2020/0086849 A1* | 3/2020 | Colavincenzo | B60L 1/02 |
| 2020/0269724 A1* | 8/2020 | Takazawa | B60K 11/02 |
| 2022/0212655 A1* | 7/2022 | Johnson | F16H 59/44 |
| 2022/0281351 A1 | 9/2022 | Bartsch et al. | |

* cited by examiner

*Primary Examiner* — Edwin A Young
(74) *Attorney, Agent, or Firm* — Carter, DeLuca & Farrell LLP

(57) ABSTRACT

A hybrid electric propulsion system includes a gearbox, an electric motor operably coupled to the gearbox, a battery operably coupled to the electric motor to power the electric motor, and an engine lubrication system. The engine lubrication system includes a tank that holds an engine lubrication fluid. The engine lubrication system includes a pump that is configured to pump the lubrication fluid from the tank toward one or both of the battery and the electric motor through a supply line to maintain one or both of the battery and the electric motor above a threshold temperature.

20 Claims, 11 Drawing Sheets

---

402 — Determining by a control system of a hybrid electric propulsion system that an ambient temperature is below an ambient temperature threshold 404 — Pumping lubrication fluid from a lubrication tank of the hybrid electric propulsion system toward a battery and/or an electric motor of the hybrid electric propulsion system to supply thermal energy to the battery and/or the electric motor based on a determination by the control system that the ambient temperature is below the ambient temperature threshold 406 — Maintaining a temperature of the battery and/or the electric motor above a temperature threshold to prolong the efficiency and/or the capacity of the battery and/or the electric motor

COMPONENT HEATING IN HYBRID ELECTRIC PROPULSION SYSTEMS

TECHNICAL FIELD

This disclosure relates to hybrid electric propulsion systems for aircraft applications and, more particularly, to methods and systems for heating one or more components (e.g., batteries) in such propulsion systems.

BACKGROUND

Temperature plays a significant role in the performance of one or more components of hybrid electric propulsion systems. For instance, batteries function based on chemical reactions and in cold weather, the chemicals cannot react as fast as in warm weather. A cold battery will, thus, not have the same power as a warm one. In order to provide sufficient electrical power in all weather conditions, it is sometimes necessary to increase the number of batteries or use bigger batteries. However, this results in weight increase, which makes hybrid electric power plants less attractive for aircraft applications.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which.

Figure 1A:
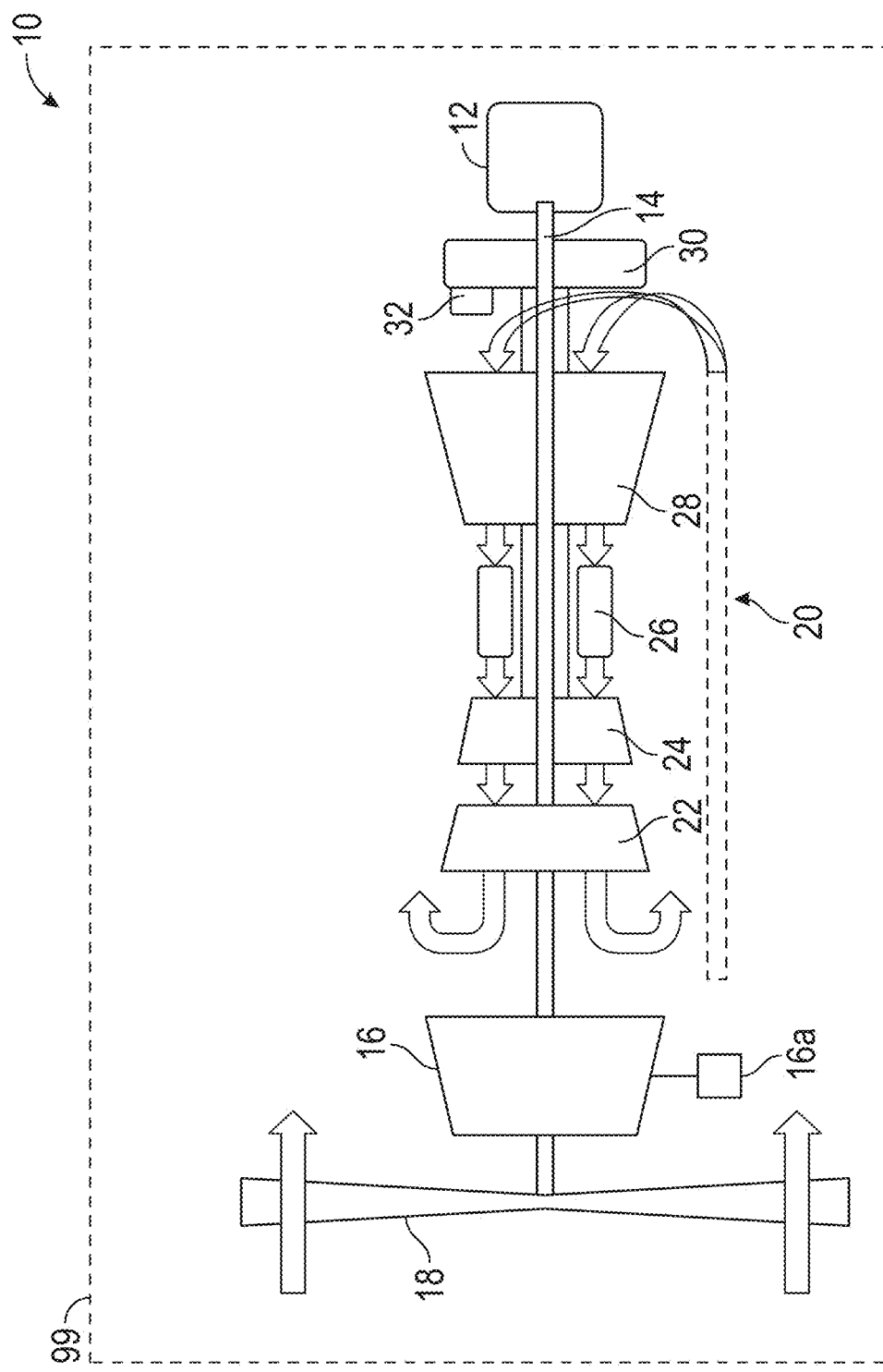
FIG. 1A is a schematic view of a hybrid electric propulsion system in accordance with the principles of this disclosure, the hybrid electrical propulsion system having an electrical machine on an aft end of a shaft at an aft end of the propulsion system for driving a gearbox on a forward end of the propulsion system, which, in turn, drives a propeller at the forward end of the propulsion system, the gearbox including a lubrication system that is separate from a turbine engine of the propulsion system.

Further exemplary aspects of the disclosure are described in more detail below with reference to the appended figures. Aspects of this disclosure may be combined without departing from the scope of the disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "forward" and "aft" refer to relative positions within a turbine engine or vehicle, and refer to the normal operational attitude of the turbine engine or vehicle. For example, with regard to a turbine engine, forward refers to a position on the turbine engine that is closer to the propeller or the fan and aft refers to a position on the turbine engine that is further away from the propeller or the fan. When the turbine engine is configured in a pusher configuration, the propeller or the fan is positioned on an aft side of the turbine engine such that forward refers to a position that is further away from the propeller or the fan and aft refers to a position that is closer to the propeller or the fan.

The terms "upstream" and "downstream" refer to the relative direction with respect to fluid flow in a fluid pathway. For example, "upstream" refers to the direction from which the fluid flows, and "downstream" refers to the direction to which the fluid flows.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, joined, etc.) are to be construed broadly and can include intermediate structural elements between a collection of elements and relative movement between elements unless otherwise indicated. Accordingly, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, the terms "first," "second," "third," etc. may be used interchangeably to distinguish one component from another and are not intended to signify location or importance of the individual components. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The singular forms "a," "an," and "the" include plural references unless the context clearly dictates otherwise.

Although this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the drawings, and specific language will be used to describe the same. It will nevertheless be understood that no limitation of the scope of this disclosure is thereby intended. Any alterations and further modifications of the inventive features illustrated herein, and any additional applications of the principles of this disclosure, as illustrated herein, which would occur to one skilled in the relevant art and having possession of this disclosure, are to be considered within the scope of this disclosure.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ this disclosure in any appropriately detailed structure.

The phrases "in an aspect," "in aspects," "in various aspects," "in some aspects," "in other aspects," or the like, may each refer to one or more of the same or different aspects in accordance with this disclosure.

In general, hybrid electric propulsion systems (e.g., for aircraft applications) of this disclosure may be in the form of a hybrid electric turbo prop engine.

As seen in FIG. 1A, a hybrid electric propulsion system 10 generally includes an electrical machine 12 on an aft end of a shaft 14 at an aft end of propulsion system 10 for driving a gearbox 16 on a forward end of the propulsion system 10, which, in turn, drives a propeller 18 at the forward end of the propulsion system 10. The shaft 14 extends along a turbine engine 20 having a low power turbine 22, a high power turbine 24 aft of the lower power turbine 22, a combustor 26 aft of the high power turbine 24, and a high power compressor 28 aft of the combustor 26. An auxiliary gear box 30, which supports a starter motor 32, is aft of the high power compressor 28 forward of the electrical machine 12. The gearbox 16 includes a lubrication system 16a that is separate from the turbine engine 20.

Figure 2:
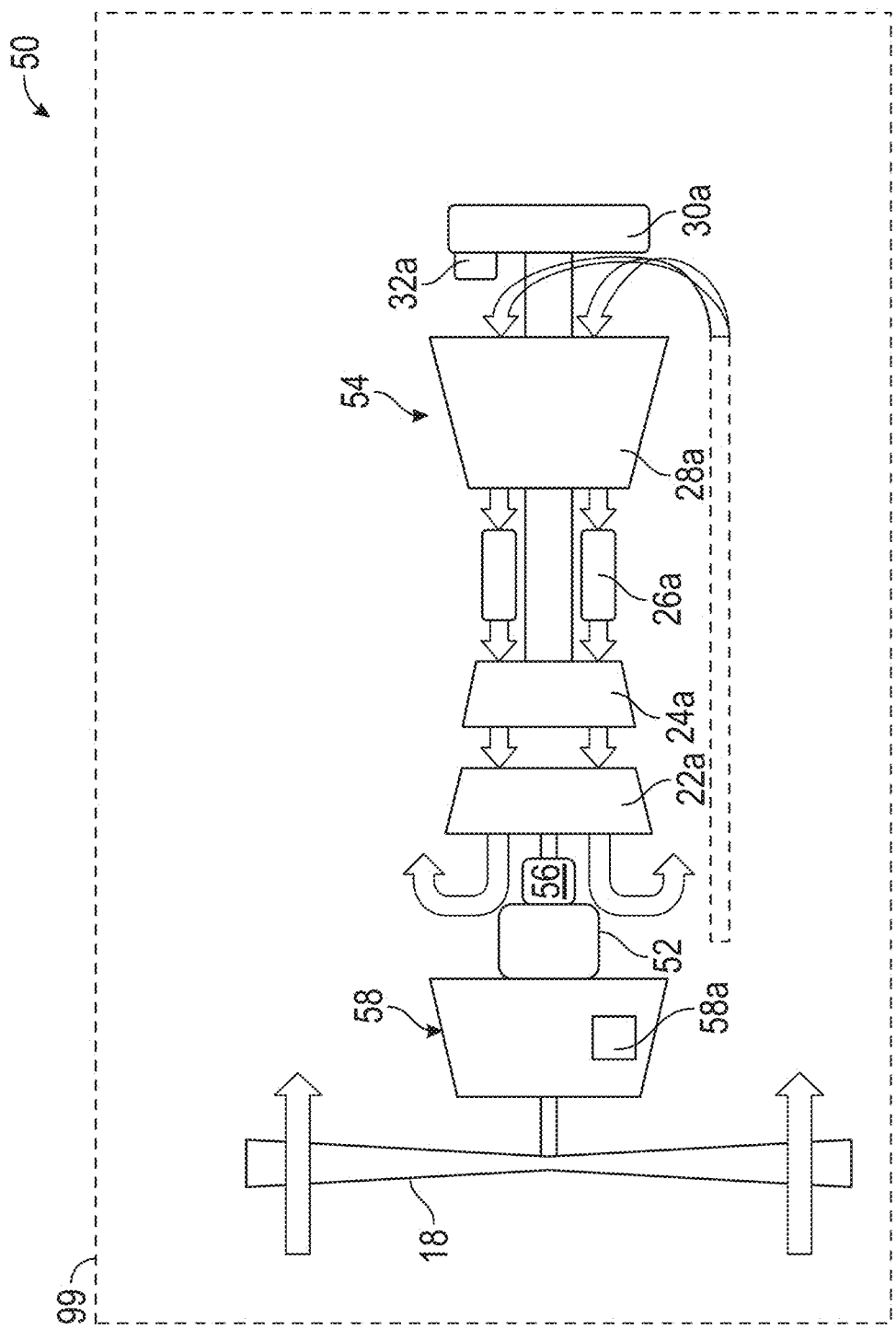
FIG. 2 is a schematic view of another hybrid electric propulsion system in accordance with the principles of this disclosure, the view illustrating the hybrid electric propulsion system with an electric motor disposed at a forward end of the propulsion system and including a gearbox with a self-contained lubrication system.

With reference to FIG. 2, another hybrid electric propulsion system 50 is generally similar to hybrid electric propulsion system 10 but includes an electric motor 52 disposed at a forward end of a turbine engine 54 without having to run a shaft all the way to the aft end of the turbine engine 54. A clutch 56 is coupled to the electric motor 52 on an aft end of the electric motor 52 and a gearbox 58 with a self-contained lubrication system 58a is coupled to the electric motor 52 at a forward end of the electric motor 52 for driving a propeller 18. However, similar to turbine engine 20, turbine engine 54 includes a low power turbine 22a, a high power turbine 24a aft of the low power turbine 22a, a combustor 26a aft of the high power turbine 24a, a high power compressor 28a aft of the combustor 26a, and an auxiliary gear box 30a that supports a starter motor 32a on an aft end of the turbine engine 54.

As can be appreciated, any of the disclosed hybrid electric propulsion systems can include or be modified to include any of the disclosed turbine engines such as the turbine engine 20 and/or the turbine engine 54 (and/or one or more components thereof such as the electrical machine 12 and/or the clutch 56). And any of the disclosed hybrid electric propulsion systems can include a control system 99 (e.g., a controller) for controlling and/or operating one or more components of the disclosed hybrid electric propulsion systems.

Figure 1B:
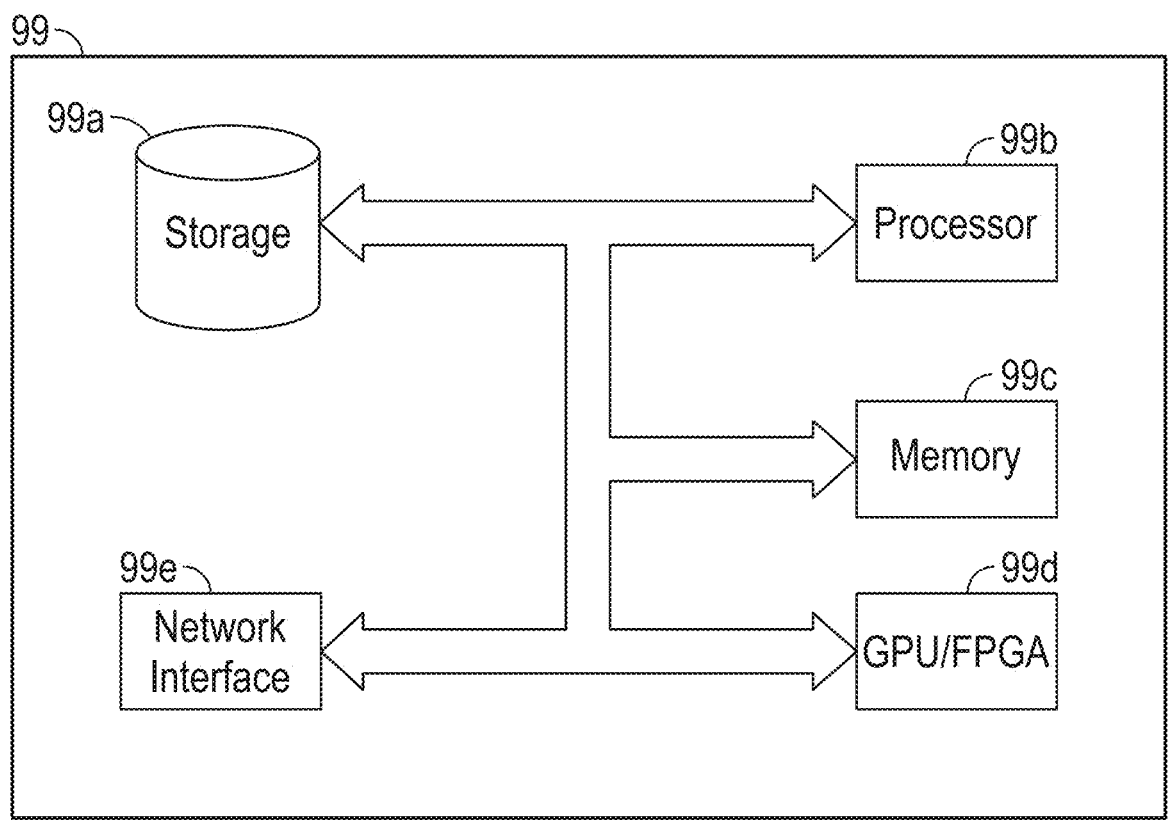
FIG. 1B is a block diagram of a control system of the hybrid electric propulsion system of FIG. 1A, in accordance with principles of this disclosure.

With brief reference to FIG. 1B, exemplary components of the control system 99 include, for example, a database 99a, one or more processors 99b, at least one memory 99c, and a network interface 99e. In aspects, the control system 99 may include a graphical processing unit (GPU) 99d, which may be used for processing machine learning network models. Various components of the control system 99 may be utilized to carry out instructions to perform the various operations of the hybrid electric propulsion systems of this disclosure. Further, the control system 99 may include communication circuitry capable of wired or wireless communication to receive data from other devices.

Indeed, as used herein, the term "control system," "controller" or the like includes "processor," "digital processing device" and like terms, and can include a component configured or adapted to provide instruction, control, operation, or any form of communication for operable components to carry out the operation thereof. A controller can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), proportional resonant controller (PR), a hardware-accelerated logic controller (e.g. for encoding, decoding, transcoding, etc.), the like, or a combination thereof. Non-limiting examples of a controller can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller can also include a data storage component accessible by the processor, including memory, whether transient, volatile or non-transient, or non-volatile memory.

Figure 3:
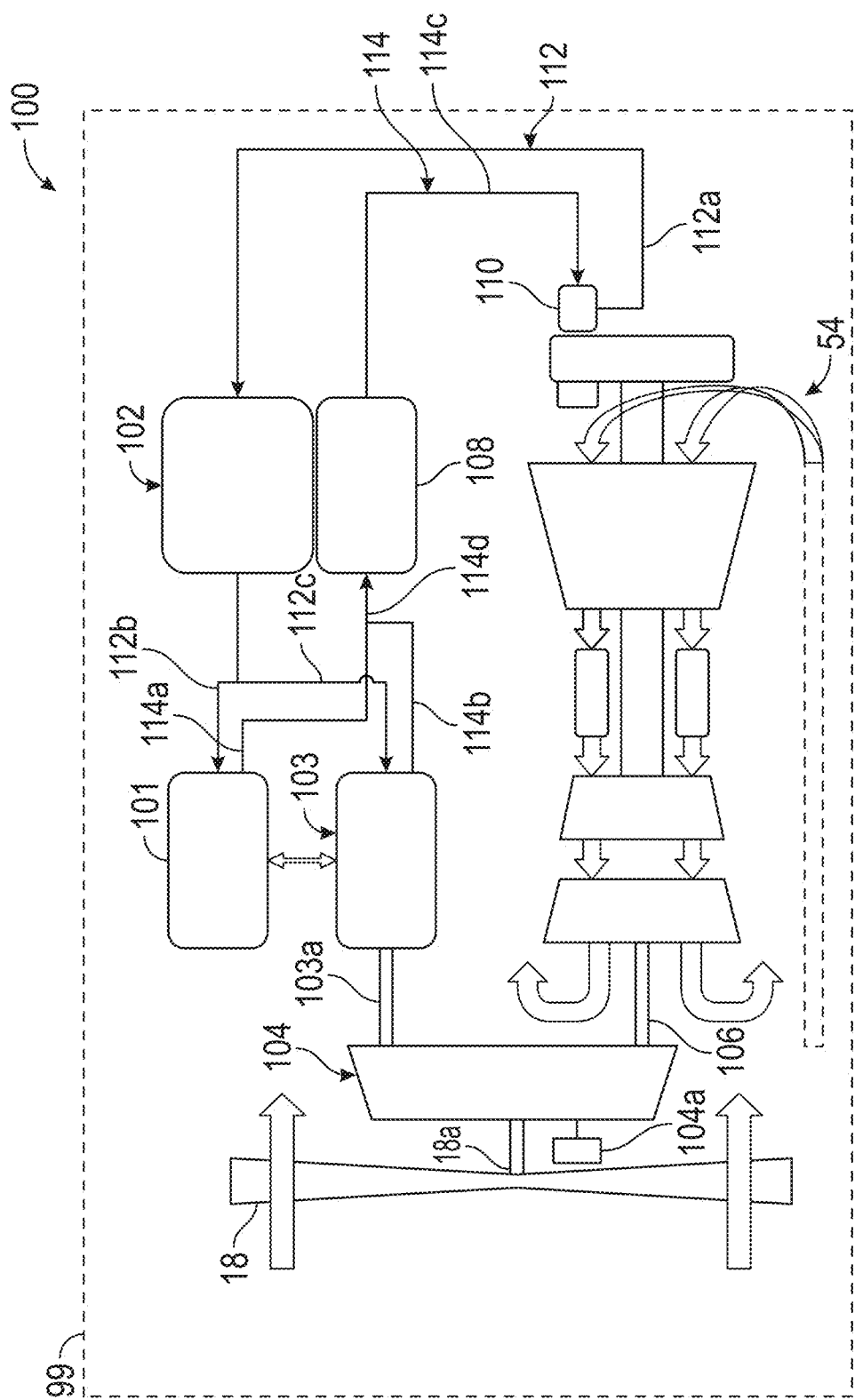
FIG. 3 is a schematic view of still another hybrid electric propulsion system in accordance with the principles of this disclosure, the view illustrating the hybrid electric propulsion system having a gearbox with a lubrication system that is separate from a turbine engine of the propulsion system, the view further illustrating an electric motor and a battery operably coupled to an engine lubrication system.

Turning now to FIG. 3, still another hybrid electric propulsion system 100 includes a turbine engine 54 operably coupled to an engine lubrication system 102 and a gearbox 104 that drives (e.g., rotates) a propeller 18 via a output shaft 18a extending forwardly of the gearbox 104 when the gearbox 104 is actuated by an input shaft 106 of the turbine engine 54. The propeller 18 is supported on a forward end of the output shaft 18a. The gearbox 104 is operably coupled to a forward end of the turbine engine 54 via the input shaft 106. The input shaft 106 extends forwardly from the turbine engine 54 to the gearbox 104 to actuate the gearbox 104. The gearbox 104 includes a gearbox lubrication system 104a for lubricating gearbox 104 and which is independent of the engine lubrication system 102 to ensure the gearbox 104 is lubricated when turbine engine 54 is shut down and/or in a windmill condition where wind causes propeller 18 to freely spin so that a gear mesh (not shown) in the gearbox 104 is lubricated while rotating.

The hybrid electric propulsion system 100 further includes a battery 101 and an electric motor 103 (e.g., an electric motor) that are operably coupled together so that the battery 101 can power the electric motor 103. As can be appreciated, the battery 101 can be disposed at an internal and/or external location of an aircraft supporting the hybrid electric propulsion system 100. The electric motor 103 includes an input shaft 103a that extends forwardly from the electric motor 103 and operably couples to the gearbox 104 for converting power from the battery 101 to mechanical (e.g., rotating) energy that can actuate the gearbox 104.

The engine lubrication system 102 of the hybrid electric propulsion system 100, which is separate from gearbox lubrication system 104a, includes a tank 108 for supporting lubrication fluid, a pump 110 for pumping the lubrication fluid from the tank 108, a supply line 112 for supplying lubrication fluid (and heat energy of the lubrication fluid) to one or more components of the hybrid electric propulsion system 100, and a return line 114 for enabling the lubrication fluid to return to the tank 108. To provide heat energy to the battery 101 and/or electric motor 103 (such as when subject to cold ambient temperatures), the supply line 112 includes a first segment 112a that extends from the pump 110, a second segment 112b that extends from the first segment 112a to the battery 101, and a third segment 112c that extends from the first segment 112a to the electric motor 103. The return line 114 includes a first segment 114a that extends between the battery 101 and the tank 108, a second segment 114b that extends between the electric motor 103 and the tank 108, and a third segment 114c that extends from the tank 108 to the pump 110. The first and second segments 114a, 114b can each connect to the tank 108 or can connect together and converge (e.g., downstream) into a unitary or fourth segment 114d that connects to the tank 108. The engine lubrication system 102 provides heat to maintain the battery 101 and/or electric motor 103 at a minimum temperature (in general, it is desirable to keep batteries at temperatures above zero degrees Celsius) when ambient temperature is below a threshold (e.g., less than zero degrees Celsius). Minimum desirable temperature is a function of the battery technology, whether it be lead-acid, Ni-Mh, Lithium or others. The minimum temperature for future battery technologies which may be developed, however, may deviate from today's battery technology. Likewise, it is desirable to keep batteries below a maximum temperature, typically below 40 degrees Celsius, in order to prevent overheating. In aspects, the threshold may be a function of the airspeed and/or acceleration of an aircraft (not shown) supporting the hybrid electric propulsion system 100.

In aspects of this disclosure, prior to starting the turbine engine 54 when the ambient temperature is below the threshold, the battery 101 provides power to heat gearbox lubrication fluid (not shown) of the gearbox lubrication system 104a. The gearbox lubrication fluid can be heated by rotating the electric motor 103 to turn the gearbox 104 at a speed, below a speed which will produce propulsive thrust, to heat the gearbox 104 by friction of oil (not shown) in the gear mesh of the gearbox 104. Rotation of gearbox 104 can be shut down when the power required to rotate the gearbox 104 (e.g., the gear mesh in the gearbox 104) at a desired motoring speed drops below a threshold. The power required to rotate a gearbox at a given nominal speed will be dependent on the specific design of the gearbox, and the power of the propulsion system. The power required to rotate a propulsion gearbox will vary linearly with the output power of the propulsion system. Thus, the threshold is set as a function of the propulsion system design, and the method of doing so is something that would be expected to be known by a person having ordinary skill in the art.

Figure 4:
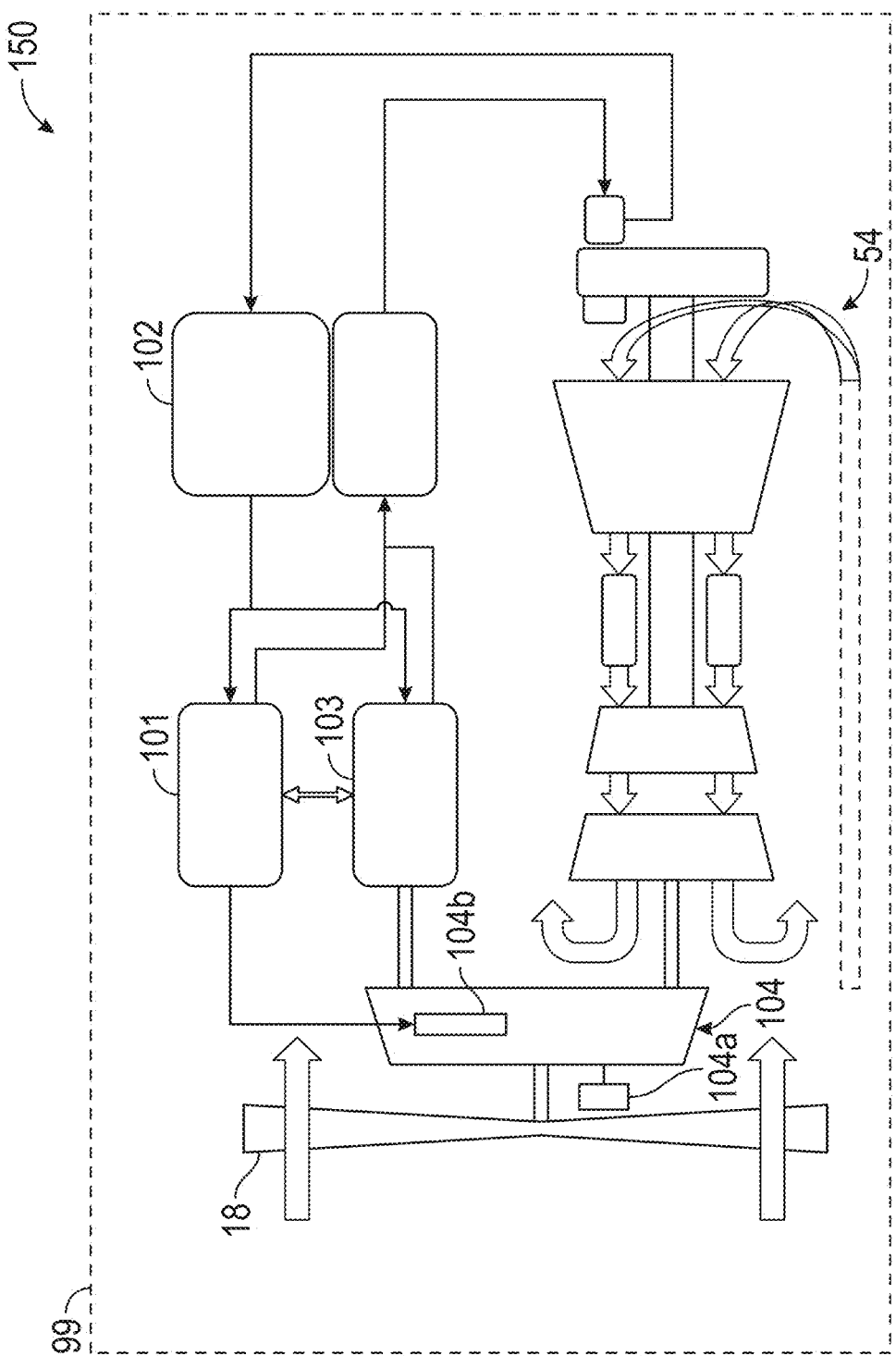
FIG. 4 is a schematic view of a hybrid electric propulsion system in accordance with the principles of this disclosure, the view illustrating the hybrid electric propulsion system having a gearbox with a lubrication system that is separate from a turbine engine of the propulsion system, the gearbox shown with an electric heating element in the gearbox, the view further illustrating an electric motor and a battery operably coupled to an engine lubrication system.

As seen in FIG. 4, in yet another hybrid electric propulsion system 150, which is similar to hybrid electric propulsion system 100, the gearbox lubrication fluid can be heated by an electric heating element 104b (e.g., resistive and/or inductive) coupled to the gearbox 104 and operably coupled to the battery 101 for heating the electric heating element 104b, for example, prior to starting the turbine engine 54. As can be appreciated, heating of gearbox 104 of the hybrid electric propulsion system 150 can be accomplished by both the electric heating element 104b and the rotation of gearbox 104 (e.g., to heat oil by friction as detailed above). As can be appreciated, the electric heating element 104b can be activated simultaneously with the rotation of gearbox 104 and/or these features can be utilized at various times and/or intervals that are independent and/or dependent of one another.

Figure 5:
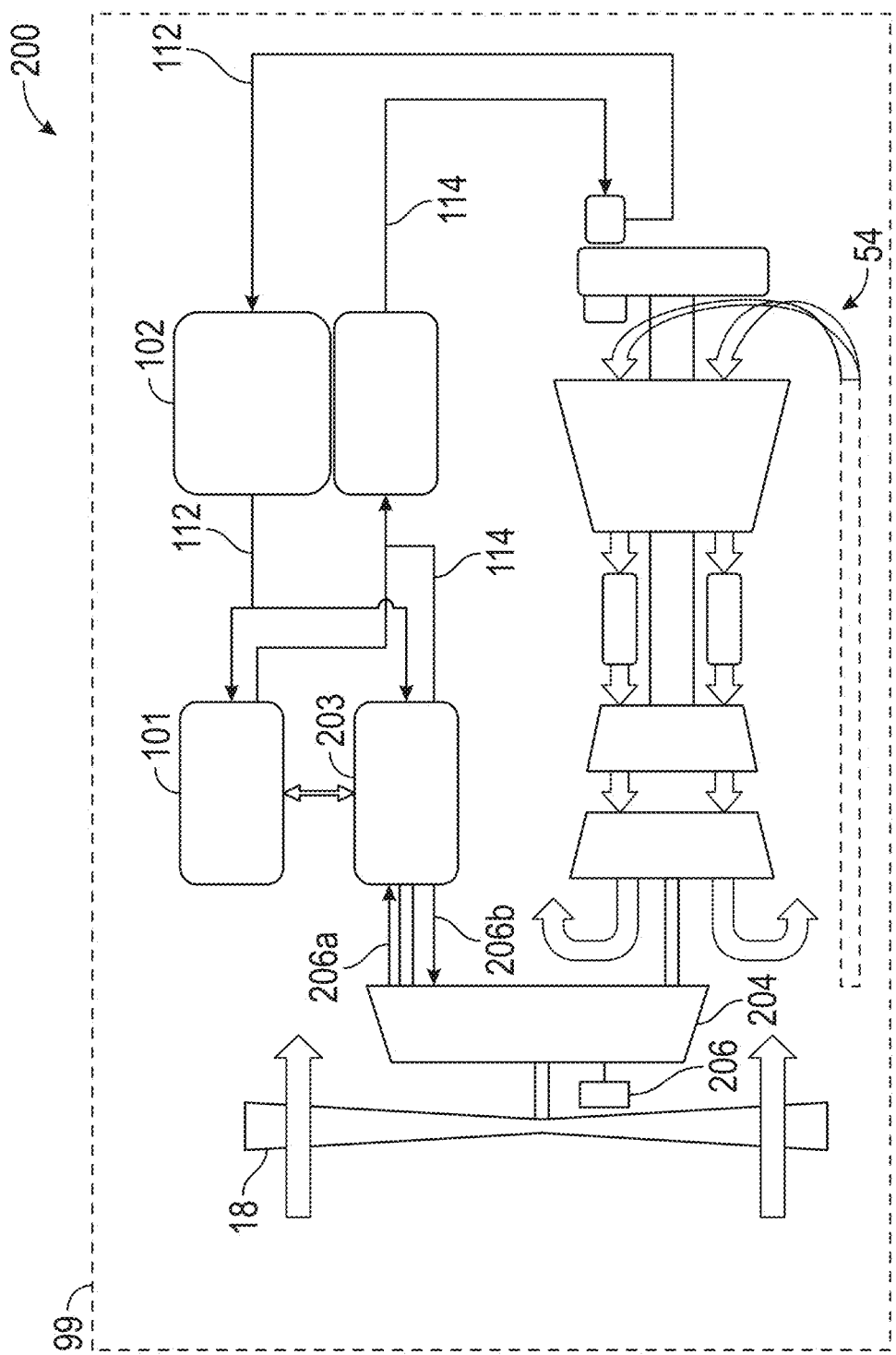
FIG. 5 is a schematic view of another hybrid electric propulsion system in accordance with the principles of this disclosure, the view illustrating the hybrid electric propulsion system having a gearbox with a lubrication system that is separate from a turbine engine of the propulsion system, the view illustrating an electric motor and a battery operably coupled to an engine lubrication system with the electric motor operably coupled to the lubrication system of the gearbox.
Figure 6:
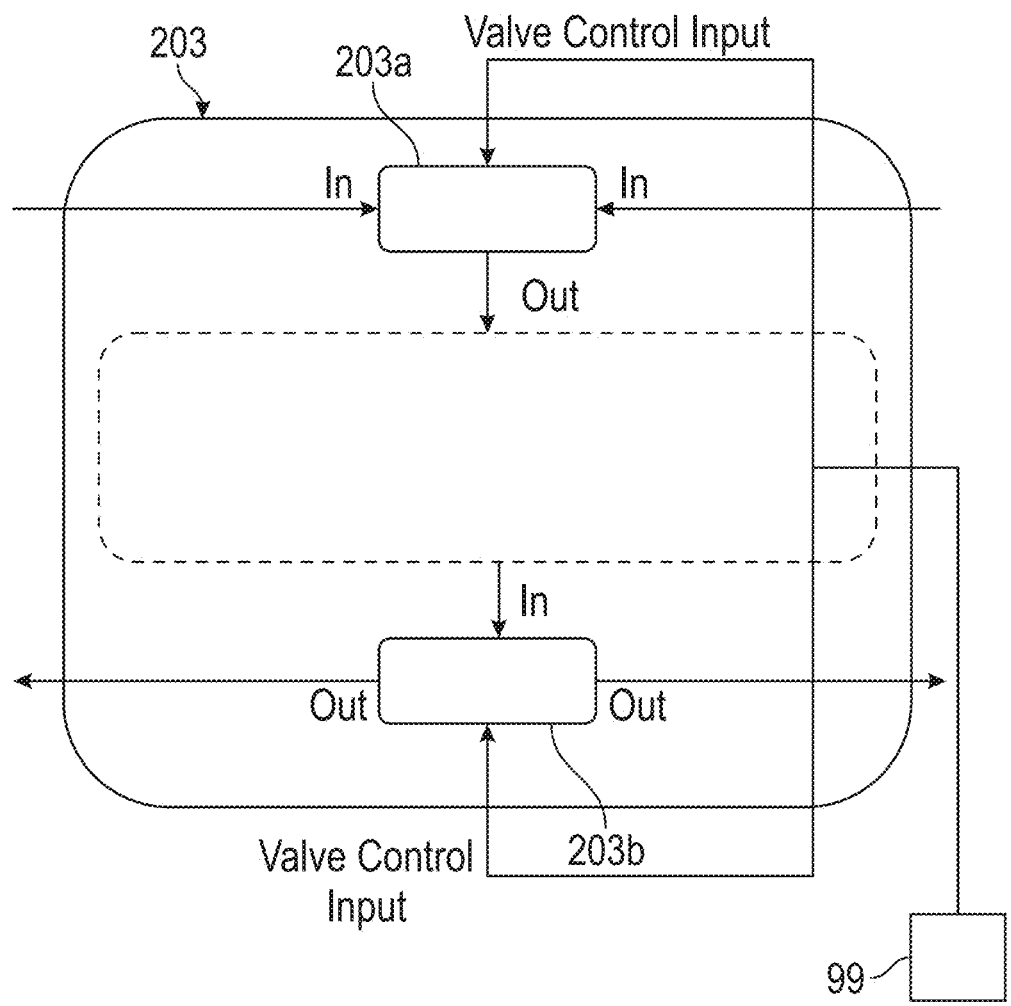
FIG. 6 is an enlarged, schematic view of the electric motor of the hybrid electric propulsion system of FIG. 5.

Turning now to FIGS. 5 and 6, in one hybrid electric propulsion system 200, which is similar to hybrid electric propulsion system 150, an electric motor 203 includes shuttle valves 203a and 203b that are controlled by lubrication pressure provided by the engine lubrication system 102 and/or by a control system 99 operatively coupled to the shuttle valves 203a and 203b. The hybrid electric propulsion system 200 further includes a gearbox 204 including a gearbox lubrication system 206 having a supply line 206a and a return line 206b that extend between the gearbox 204 and the electric motor 203 and/or the battery 101. The shuttle valves 203a and 203b are connected to the supply and return lines 112, 114 of the engine lubrication system 102 and the supply and return lines 206a, 206b of the gearbox lubrication system 206. Controlling the shuttle valves 203a and/or 203b enables the turbine engine 54 to be shut down in flight with the electric motor 203 receiving lubrication from the gearbox lubrication system 206. The electric motor 203 is configured to receive lubrication from either the gearbox lubrication system 206 or the engine lubrication system 102. In aspects, the shuttle valves 203a and/or 203b are configured to switch between the gearbox lubrication system 206 and the engine lubrication system 102. In some aspects, the shuttle valves 203a and/or 203b are configured to provide selective lubrication to both the electric motor 203 and the battery 101.

Figure 7:
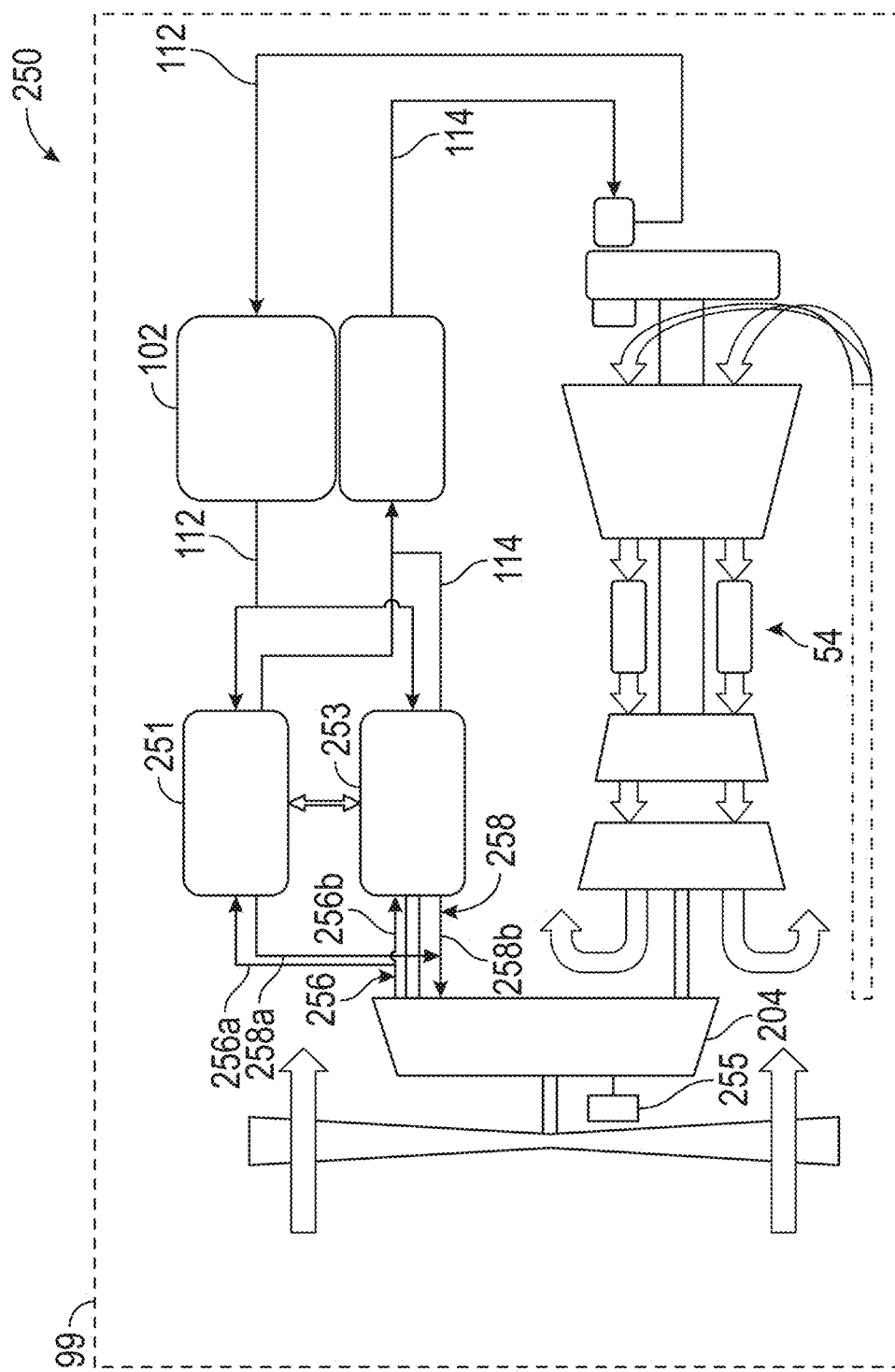
FIG. 7 is a schematic view of yet another hybrid electric propulsion system in accordance with the principles of this disclosure, the view illustrating the hybrid electric propulsion system with an electric motor, a battery, and shuttle valves operably coupled to an engine lubrication system.
Figure 8:
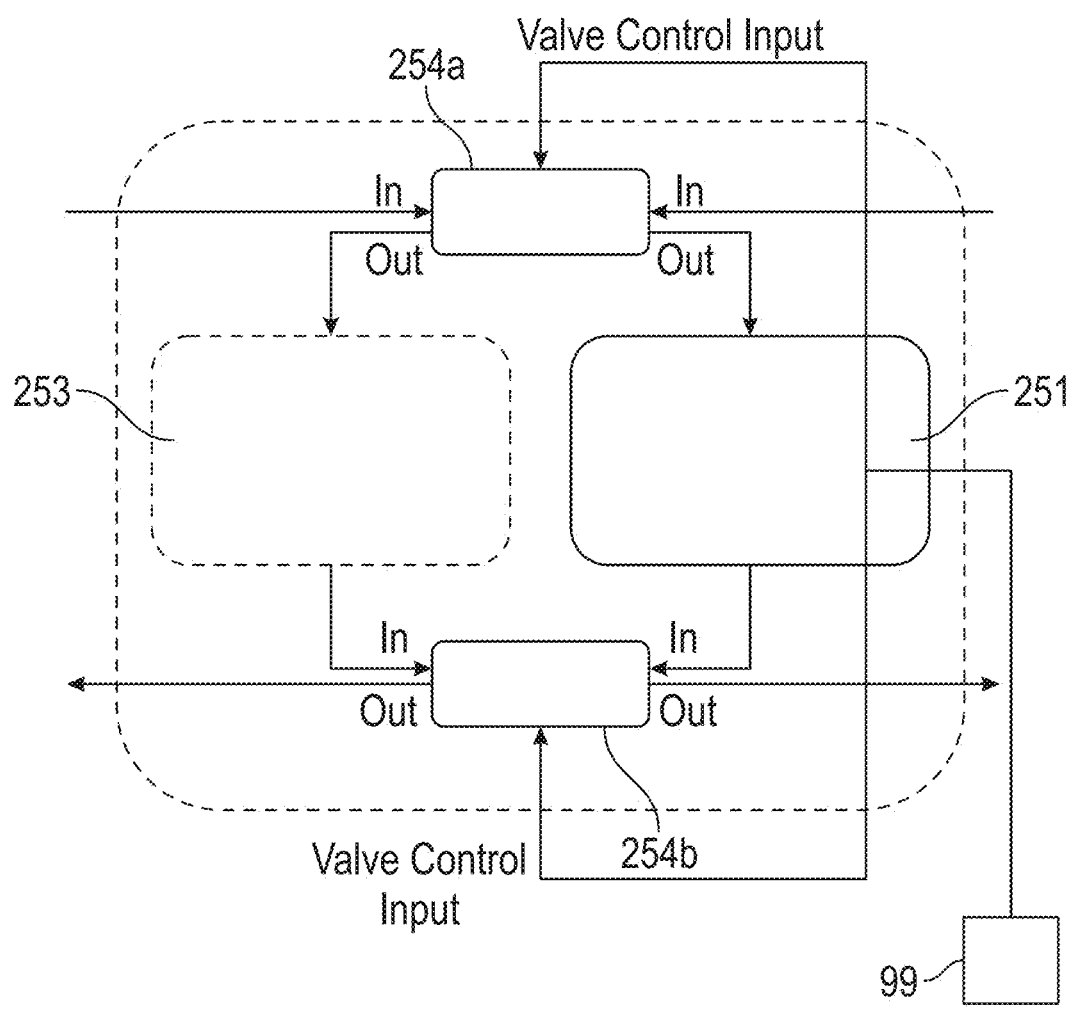
FIG. 8 is an enlarged, schematic view illustrating the shuttle valves of the hybrid electric propulsion system of FIG. 7.

As seen in FIGS. 7 and 8, in another hybrid electric propulsion system 250, which is similar to hybrid electric propulsion system 200, an electric motor 253 and a battery 251 can include separate shuttle valves 254a, 254b that are independently controlled by a control system 99. The hybrid electric propulsion system 250 further includes a gearbox lubrication system 255 having supply and return lines 256, 258, which are coupled to shuttle valves 254a, 254b, respectively. The supply and return lines 256, 258 extend between the gearbox 204 and the electric motor 253 and/or the battery 251. The supply line 256 includes a battery segment 256a that extends to the battery 251 and an electric motor segment 256b that extends to the electric motor 253. The battery segment 256a and the electric motor segment 256b are coupled together by shuttle valve 254a. The return line 258 includes a battery segment 258a that extends from the battery 251 and an electric motor segment 258b that extends from the electric motor 253. The battery segment 258a and the electric motor segment 258b are connected together by shuttle valve 254b. In aspects, the turbine engine 54 can be reduced to idle to continue to provide heat to the battery 251 as necessary while the battery 251 and the electric motor 253 provide propulsive power.

Figure 9:
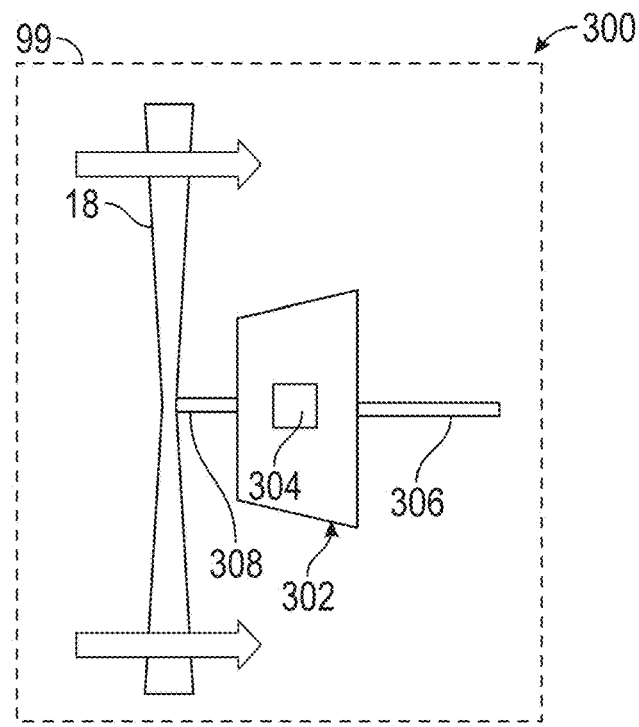
FIG. 9 is a schematic view of another hybrid electric propulsion system in accordance with the principles of this disclosure, the view illustrating a gearbox with a self-contained lubrication system.
Figure 10:
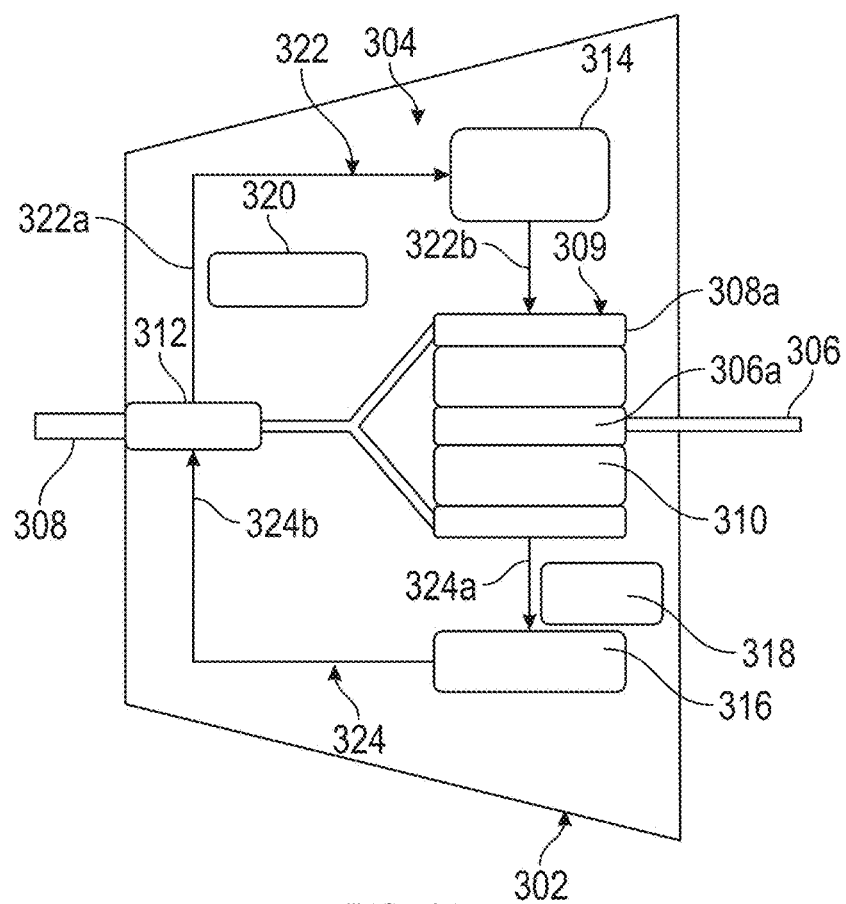
FIG. 10 is an enlarged, schematic view of the gearbox of the hybrid electric propulsion system of FIG. 9.

Turning now to FIGS. 9 and 10, in one hybrid electric propulsion system 300, which is similar to hybrid electric propulsion system 50, a gearbox 302 supports a self-contained lubrication system 304 and includes an input shaft 306 (e.g., an output shaft which extends forwardly from a turbine engine such as the turbine engine 54 shown in FIG. 2) and an output shaft 308 that extends forwardly from the gearbox 302 and supports a propeller 18. The input shaft 306 and the output shaft 308 are coupled together by a gear mesh 309. The gear mesh 309 includes a forward end gear portion 306a of the input shaft 306 that cooperates with an inner gear assembly 310, which may be in the form of an epicyclic gear set. The gear mesh 309 further includes an aft end gear portion 308a of the output shaft 308 that cooperates with the inner gear assembly 310 such that rotation of the input shaft 306 causes rotation of the inner gear assembly 310 and the output shaft 308 to rotate the propeller 18. The self-contained lubrication system 304 includes a pump 312 that can be supported on either the input shaft 306 or the output shaft 308, a heat exchanger 314, a tank 316, a level sensor 318 associated with the tank 316, and a pressure sensor 320. The self-contained lubrication system 304 includes a supply line 322 having a first segment 322a that extends between the pump 312 and the heat exchanger 314 and a second segment 322b that extends between the heat exchanger 314 and the gear mesh 309. The self-contained lubrication system 304 includes a return line 324 having a first segment 324a that extends between the gear mesh 309 and the tank 316 and a second segment 324b that extends between the tank 316 and the pump 312.

Figure 11:
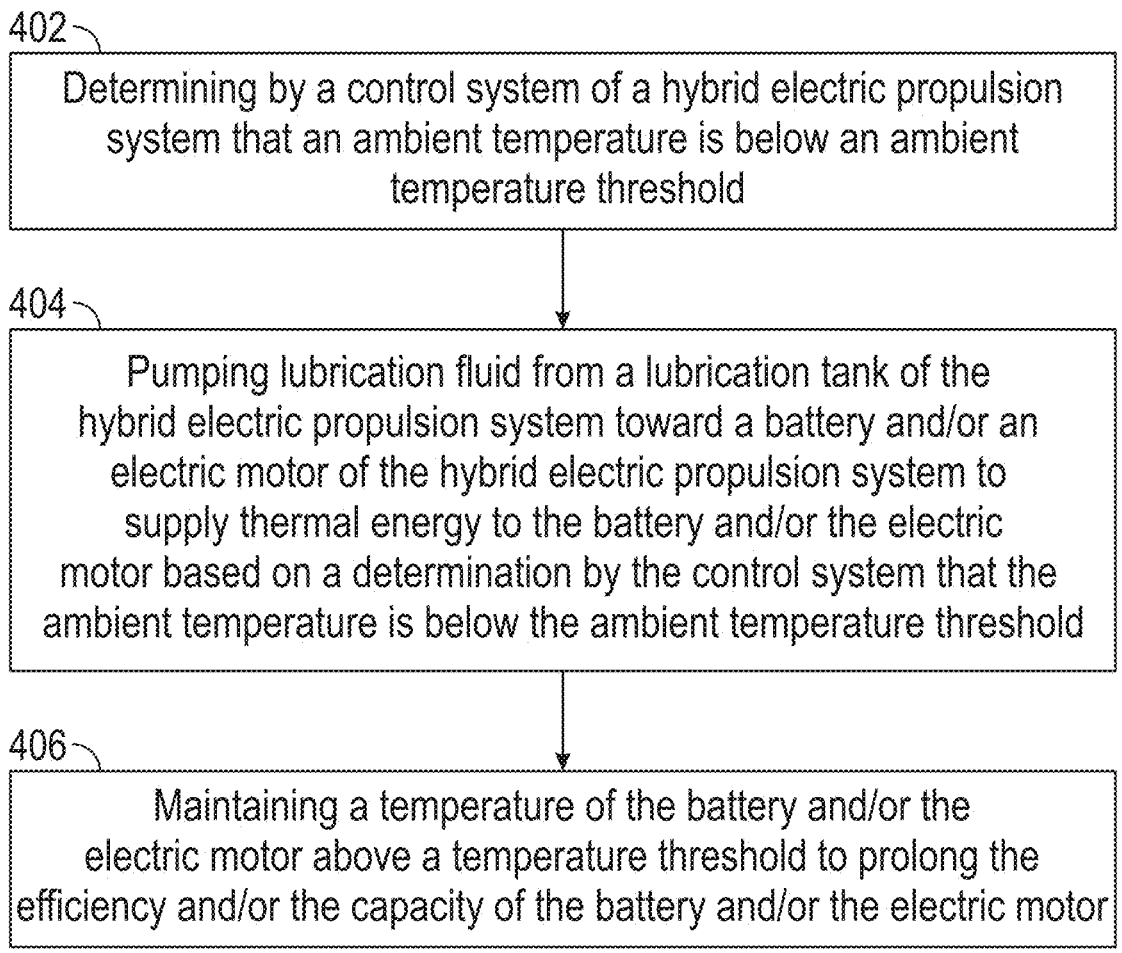
FIG. 11 illustrates a flow chart of a method for regulating temperature of a battery and/or an electric motor.

With reference to FIG. 11, as seen in step 402, a method for regulating temperature of a battery and/or an electric motor includes determining by a control system of a hybrid electric propulsion system that an ambient temperature is below an ambient temperature threshold. In step 404, the method includes pumping lubrication fluid from a lubrication tank of the hybrid electric propulsion system toward a battery and/or an electric motor of the hybrid electric propulsion system to supply thermal energy to the battery and/or the electric motor based on a determination by the control system that the ambient temperature is below the ambient temperature threshold. In step 406, the method includes maintaining a temperature of the battery and/or the electric motor above a temperature threshold to prolong the efficiency and/or the capacity of the battery and/or the electric motor.

In short, maintaining battery and/or electric motor temperatures in hybrid electric propulsion systems above temperature thresholds (e.g., above zero degrees Celsius) helps to prolong efficiency and/or capacity in these hybrid electric propulsion systems. To counter ambient conditions that cause temperatures in these devices to decrease, such as cold ambient temperatures (e.g., below zero degrees Celsius) and/or high aircraft speeds (e.g., 100 mph or more), this disclosure advantageously details lubrication systems that provide thermal energy to these batteries and/or electric motor for maintaining these devices above temperature thresholds, such as zero degrees Celsius, to prolong the efficiency and/or capacity of the disclosed hybrid electric propulsion systems.

Further aspects of the present disclosure are provided by the subject matter of the following clauses.

A hybrid electric propulsion system comprises a turbine engine, a gearbox, an electric motor, a battery, and an engine lubrication system. The gearbox is operably coupled to the turbine engine and includes an output shaft. The turbine engine is configured to actuate the gearbox to rotate the output shaft. The electric motor is operably coupled to the gearbox and is configured to actuate the gearbox to rotate the output shaft. The battery operably is coupled to the electric motor to power the electric motor. The engine lubrication system includes a tank that holds an engine lubrication fluid. The engine lubrication system includes a pump that is configured to pump the engine lubrication fluid from the tank toward the battery through a supply line to maintain the battery above a temperature threshold.

The hybrid electric propulsion system of the preceding clause, wherein the engine lubrication system is configured to provide the engine lubrication fluid to the electric motor.

The hybrid electric propulsion system of any of the preceding clauses, further comprising a gearbox lubrication system that is separate from and independent of the engine lubrication system.

The hybrid electric propulsion system of any of the preceding clauses, wherein the gearbox includes an electric heating element that is operably coupled to the battery and configured to heat gearbox lubrication fluid held in the gearbox.

The hybrid electric propulsion system of any of the preceding clauses, wherein the electric heating element includes at least one of a resistive heating element or an inductive heating element.

The hybrid electric propulsion system of any of the preceding clauses, wherein the gearbox includes a self-contained lubrication system that is contained within the gearbox.

The hybrid electric propulsion system of any of the preceding clauses, wherein an input shaft connects the turbine engine to the gearbox, and wherein the input shaft and the output shaft are coupled together by a gear mesh disposed within the gearbox.

The hybrid electric propulsion system of any of the preceding clauses, wherein the self-contained lubrication system of the gearbox includes a gearbox tank that supports gearbox lubrication fluid, a gearbox pump that pumps the gearbox lubrication fluid through a gearbox supply line, a gearbox heat exchanger coupled to the gearbox supply line, and a gearbox return line that returns the gearbox lubrication fluid to the gearbox tank.

The hybrid electric propulsion system of any of the preceding clauses, wherein the gearbox pump of the self-contained lubrication system of the gearbox is supported by at least one of the input shaft or the output shaft.

The hybrid electric propulsion system of any of the preceding clauses, wherein the engine lubrication system further includes a return line that returns the engine lubrication fluid to the tank, and wherein the engine lubrication system further includes at least one shuttle valve operably associated with at least one of the electric motor or the battery, the at least one shuttle valve operably coupled to at least one of the supply line or the return line to enable at least one of the electric motor or the battery to receive at least one of the engine lubrication fluid of the engine lubrication system or a gearbox lubrication fluid from the gearbox.

A hybrid electric propulsion system of an aircraft comprises a control system, a turbine engine, a gearbox, an electric motor, a battery, and an engine lubrication system. The gearbox is operably coupled to the turbine engine. The electric motor is operably coupled to the gearbox. The battery is operably coupled to the control system and the electric motor to power the electric motor. The battery is supported on an external surface of the aircraft and configured to be exposed to an ambient temperature. The engine lubrication system includes a tank that holds an engine lubrication fluid. The engine lubrication system includes a pump that is operably coupled to the control system and configured to pump the engine lubrication fluid from the tank toward the battery through a supply line to maintain the battery above a battery temperature threshold when the control system determines that the ambient temperature is below an ambient temperature threshold.

The hybrid electric propulsion system of the preceding clause, wherein the ambient temperature threshold is a function of at least one of speed or acceleration of the aircraft.

The hybrid electric propulsion system of any of the preceding clauses, wherein the gearbox supports a gearbox lubrication fluid and wherein prior to starting the turbine engine when the ambient temperature is below the ambient temperature threshold, the control system is configured to cause the battery to provide power to an electric heating element to heat the gearbox lubrication fluid.

The hybrid electric propulsion system of any of the preceding clauses, wherein actuation of the electric motor causes a gear mesh in the gearbox to rotate.

The hybrid electric propulsion system of any of the preceding clauses, wherein the gearbox holds gearbox lubrication fluid, and wherein the control system is configured to cause the electric motor to rotate the gear mesh at a speed below which produces propulsive thrust, the speed being sufficient to heat the gearbox lubrication fluid in the gear mesh by friction.

The hybrid electric propulsion system of any of the preceding clauses, wherein the control system is configured to shut down rotation of the gear mesh when the control system determines that an amount of power required to rotate the gear mesh drops below a threshold power.

The hybrid electric propulsion system of any of the preceding clauses, wherein the control system is configured to cause the gearbox lubrication fluid to be heated by at least one electric heating element.

The hybrid electric propulsion system of any of the preceding clauses, wherein the control system is configured to cause at least one electric heating element to heat the gearbox lubrication fluid before the turbine engine is started.

The hybrid electric propulsion system of any of the preceding clauses, wherein the electric motor is configured to receive at least one of the engine lubrication fluid from the engine lubrication system or a gearbox lubrication fluid from the gearbox.

A hybrid electric propulsion system comprises a gearbox, an electric motor, a battery, and an engine lubrication system. The electric motor is operably coupled to the gearbox. The battery is operably coupled to the electric motor to power the electric motor. The engine lubrication system includes a tank that holds engine lubrication fluid, a pump configured to pump the engine lubrication fluid from the tank toward at least one of the battery or the electric motor through a supply line to maintain at least one of the battery or the electric motor above a temperature threshold.

A method of heating a component of a hybrid electric propulsion system comprises heating at least one of a battery or an electric motor of the hybrid electric propulsion system with lubrication fluid from at least one of a gearbox of the hybrid electrical propulsion system or an engine lubrication system of the hybrid electrical propulsion system.

Persons skilled in the art will understand that the structures and methods specifically described herein and shown in the accompanying figures are non-limiting exemplary aspects, and that the description, disclosure, and figures should be construed merely as exemplary of aspects. It is to be understood, therefore, that the present disclosure is not limited to the precise aspects described, and that various other changes and modifications may be effected by one skilled in the art without departing from the scope or spirit of the disclosure. Additionally, the elements and features shown or described in connection with certain aspects may be combined with the elements and features of certain other aspects without departing from the scope of the present disclosure, and that such modifications and variations are also included within the scope of the present disclosure. Accordingly, the subject matter of the present disclosure is not limited by what has been particularly shown and described.

What is claimed is:

1. A hybrid electric propulsion system, comprising:
   a turbine engine;
   a gearbox operably coupled to the turbine engine and including an output shaft, the turbine engine configured to actuate the gearbox to rotate the output shaft;
   an electric motor operably coupled to the gearbox and configured to actuate the gearbox to rotate the output shaft;
   a battery operably coupled to the electric motor to power the electric motor; and
   an engine lubrication system including a tank that holds an engine lubrication fluid, the engine lubrication system including a pump that is configured to pump the engine lubrication fluid from the tank toward the battery through a supply line to maintain the battery above a temperature threshold.

2. The hybrid electric propulsion system of claim 1, wherein the engine lubrication system is configured to provide the engine lubrication fluid to the electric motor.

3. The hybrid electric propulsion system of claim 1, further comprising a gearbox lubrication system that is separate from and independent of the engine lubrication system.

4. The hybrid electric propulsion system of claim 3, wherein the gearbox includes an electric heating element that is operably coupled to the battery and configured to heat gearbox lubrication fluid held in the gearbox.

5. The hybrid electric propulsion system of claim 4, wherein the electric heating element includes at least one of a resistive heating element or an inductive heating element.

6. The hybrid electric propulsion system of claim 1, wherein the gearbox includes a self-contained lubrication system that is contained within the gearbox.

7. The hybrid electric propulsion system of claim 6, wherein an input shaft connects the turbine engine to the gearbox, and wherein the input shaft and the output shaft are coupled together by a gear mesh disposed within the gearbox.

8. The hybrid electric propulsion system of claim 7, wherein the self-contained lubrication system of the gearbox includes a gearbox tank that supports gearbox lubrication fluid, a gearbox pump that pumps the gearbox lubrication fluid through a gearbox supply line, a gearbox heat exchanger coupled to the gearbox supply line, and a gearbox return line that returns the gearbox lubrication fluid to the gearbox tank.

9. The hybrid electric propulsion system of claim 8, wherein the gearbox pump of the self-contained lubrication system of the gearbox is supported by at least one of the input shaft or the output shaft.

10. The hybrid electric propulsion system of claim 1, wherein the engine lubrication system further includes a return line that returns the engine lubrication fluid to the tank, and wherein the engine lubrication system further includes at least one shuttle valve operably associated with at least one of the electric motor or the battery, the at least one shuttle valve operably coupled to at least one of the supply line or the return line to enable at least one of the electric motor or the battery to receive at least one of the engine lubrication fluid of the engine lubrication system or a gearbox lubrication fluid from the gearbox.

11. A hybrid electric propulsion system of an aircraft, the hybrid electric propulsion system comprising:
a control system;
a turbine engine;
a gearbox operably coupled to the turbine engine;
an electric motor operably coupled to the gearbox;
a battery operably coupled to the control system and the electric motor to power the electric motor, the battery supported on an external surface of the aircraft and configured to be exposed to an ambient temperature; and
an engine lubrication system including a tank that holds an engine lubrication fluid, the engine lubrication system including a pump that is operably coupled to the control system and configured to pump the engine lubrication fluid from the tank toward the battery through a supply line to maintain the battery above a battery temperature threshold when the control system determines that the ambient temperature is below an ambient temperature threshold.

12. The hybrid electric propulsion system of claim 11, wherein the ambient temperature threshold is a function of at least one of speed or acceleration of the aircraft.

13. The hybrid electric propulsion system of claim 11, wherein the gearbox supports a gearbox lubrication fluid and wherein prior to starting the turbine engine when the ambient temperature is below the ambient temperature threshold, the control system is configured to cause the battery to provide power to an electric heating element to heat the gearbox lubrication fluid.

14. The hybrid electric propulsion system of claim 11, wherein actuation of the electric motor causes a gear mesh in the gearbox to rotate.

15. The hybrid electric propulsion system of claim 14, wherein the gearbox holds gearbox lubrication fluid, and wherein the control system is configured to cause the electric motor to rotate the gear mesh at a speed below which produces propulsive thrust, the speed being sufficient to heat the gearbox lubrication fluid in the gear mesh by friction.

16. The hybrid electric propulsion system of claim 15, wherein the control system is configured to shut down rotation of the gear mesh when the control system determines that an amount of power required to rotate the gear mesh drops below a threshold power.

17. The hybrid electric propulsion system of claim 15, wherein the control system is configured to cause the gearbox lubrication fluid to be heated by at least one electric heating element.

18. The hybrid electric propulsion system of claim 17, wherein the control system is configured to cause the at least one electric heating element to heat the gearbox lubrication fluid before the turbine engine is started.

19. The hybrid electric propulsion system of claim 11, wherein the electric motor is configured to receive at least one of the engine lubrication fluid from the engine lubrication system or a gearbox lubrication fluid from the gearbox.

20. A hybrid electric propulsion system comprising:
a gearbox;
an electric motor operably coupled to the gearbox;
a battery operably coupled to the electric motor to power the electric motor; and
an engine lubrication system including a tank that holds engine lubrication fluid, a pump configured to pump the engine lubrication fluid from the tank toward at least one of the battery or the electric motor through a supply line to maintain at least one of the battery or the electric motor above a temperature threshold.

\* \* \* \* \*